UNITED STATES PATENT OFFICE.

HERMAN HEUSER, OF EVANSTON, ILLINOIS.

ART OF PRESERVING LIQUID FOODS.

1,390,709.  Specification of Letters Patent.  Patented Sept. 13, 1921.

No Drawing.  Application filed September 22, 1919.  Serial No. 325,527.

*To all whom it may concern:*

Be it known that HERMAN HEUSER, a citizen of the United States, residing at Evanston, in the county of Cook and State of Illinois, has invented a new and useful Improvement in the Art of Preserving Liquid Foods, of which the following is a specification.

The present invention relates to the preservation of liquid food products and particularly of such products as are subject to deleterious chemical or bacteriological changes by the reason of the presence of oxygen, such as fruit juices, syrup, milk, etc.

It has been found that liquids containing fruit or vegetable flavors or extracts, sugars, or soluble proteids, such as fruit juices or syrups and beverages produced therefrom, milk, etc., are not adequately preserved against deterioration by pasteurization of the usual character or by the addition of chemical preservatives when the latter are present in non-toxic or legally permissible proportions. Thus in the case of apple juice the presence of benzoate of soda in the legally permissible amount, 0.10%, while effective in preventing yeast propagation, does not effectually check the growth of acetic-acid bacteria and hence does not preserve the palatability of the liquid. Pasteurization at unusually high temperatures or for unusually long periods may sometimes be effectual in preventing bacterial growth, but itself produces highly undesirable changes in the flavor and characteristics of the liquid treated.

It has furthermore been found that these undesirable changes in liquid food compounds may be prevented and the compounds adequately preserved by the removal of oxygen therefrom coupled with pasteurization or the addition of a chemical preservative thereto. The removal of oxygen may be effected by physical means, such as subjecting the compound to a high vacuum while agitating it and breaking the vacuum by supplying oxygen-free gas such as carbon dioxid, or by the addition of suitable chemical reducing agents. The reducing agents employed are preferably of such character that their oxidation results in the formation of non-toxic or even desirable substances, as, for example, sulfurous acid or derivatives thereof and formic acid or compounds thereof.

In carrying out the invention it is preferred that the quantity of reducing agent be just sufficient to completely reduce the oxygen contained in the beverage, or a quantity very slightly greater than this amount may be utilized, particularly in the case of such reducing agents as formic acid which present no toxic effects in such amounts. The presence of the reducing agent furthermore aids markedly in the preservation of the food compound, permitting the use of ordinary pasteurization processes or of markedly reduced amounts of chemical preservatives of which the non-reducing compounds are preferred. Thus apple juice may be preserved by the addition of about 0.002% of $SO_2$ or its equivalent in addition to the permissible 0.10% of sodium benzoate, however, complete preservation is effected by the use of 0.05% of sodium benzoate when about 0.002% of $SO_2$ (or equivalent) is added. The sulfurous acid disappears completely on storage. When formic acid is used, 0.005 to 0.015% of formic acid or equivalent of formate may be added, together with 0.10% of sodium benzoate to effect complete preservation.

In the case of pasteurized liquids, such as milk, these may suitably be vacuumized before pasteurization, under normal conditions, for example, for 15 to 20 minutes at 120° F., or may be treated with a proper quantity of non-toxic reducing agent, for example, about 0.01 to 0.015% formic acid (or equivalent of formate) before pasteurization. $SO_2$ or its equivalent may likewise be employed to the extent of 0.002 to 0.005% $SO_2$, it having been found that the formic acid is most effective in acid media.

It has been found preferable in utilizing the present process to combine the reducing agent and the preservative agent employed in suitable proportions for convenience in use. Thus by adding sodium sulfite to sodium benzoate in the proportions of from 7 to 12 parts of sodium sulfite to 100 parts of sodium benzoate a preservative is obtained which may readily be utilized in preparing liquid food products. Likewise by preparing a solution containing 10 to 30 parts of formic acid to 100 parts of sodium benzoate a readily utilizable preservative for carrying out the present process may be prepared.

It is readily apparent that foods comprised of liquids containing suspended solids are capable of treatment in accordance with the present process, and such food compounds are to be included within the scope of the term "liquid foods" as used herein. It is furthermore apparent that the details of the specific examples hereinbefore recited and the theoretical statements made are not intended as limitations upon the scope of the claims, except in so far as included therein.

I claim:

1. The process of preserving liquid food compounds which consists in adding thereto a reducing agent in quantity sufficient to remove the oxygen therefrom and a chemical preservative.

2. The process of preserving liquid food compounds which consists in adding thereto $SO_2$ or a derivative thereof in quantity sufficient to remove the oxygen therefrom and a non-reducing chemical preservative.

3. The process of preserving liquid food compounds which consists in adding thereto about 0.002% of $SO_2$ in the form of sulfite and sodium benzoate.

4. As a chemical preservative, a mixture containing 7 to 12 parts of sodium sulfite to 100 parts of sodium benzoate.

HERMAN HEUSER.